June 29, 1965  E. H. HANDLER  3,191,202
MINIMUM MOTION MOORED BUOY SYSTEM
Filed July 31, 1963  2 Sheets-Sheet 1

INVENTOR
EUGENE H. HANDLER

BY Claude Funkhouser
ATTORNEY

3,191,202
MINIMUM MOTION MOORED BUOY SYSTEM
Eugene H. Handler, 4217 Brookfield Drive,
Kensington, Md.
Filed July 31, 1963, Ser. No. 299,121
2 Claims. (Cl. 9—8)
(Granted under Title 35, U.S. Code (1952), sec. 266)

The invention described herein may be manufactured and used by or for the government of the United States of America for governmental purposes without the payment of any royalties thereon or therefor.

The present invention relates generally to an improved minimum motion moored buoy system. More particularly, the invention relates to a new and improved mooring system for planting highly stable signal transmitting buoys in a body of water.

In recent years oceanographic studies have become more numerous, more sophisticated and have contributed significant knowledge to the modern aquatic technology. Oceanographic technology is indispensably concerned with the environmental conditions within the sea. To enable scientists to make valid inferences from experimental data received from the sea and to derive reasonably accurate conclusions therefrom, it is of vital importance in many experiments to know the conditions of the sea for the period of time during which the experiment is conducted. For example, if a scientist utilizes a sound device to transmit sound waves through the water to the bottom of the ocean and records the echo thereby to determine the ocean depth, it is very essential that the experimenter know the various temperatures, pressures, densities, etc., of the various strata of water existant between sea level and the sea bottom.

Experiments concerning the phenomena of the sea are often of great magnitude and require the knowledge of continuous conditions in the sea at various widely spaced coordinates over long periods of time. To this end, the instant invention is directed to and concerns a moored system which is capable of measuring the conditions at the various levels in the sea and which is capable of transmitting intelligence correlative to these conditions to a remote receiver.

Conventional buoys have been utilized in prior art applications to carry both electronic gear to measure the environmental conditions of the sea and radio transmitters with directional antennas to transmit this data to a remote receiver. Although the conventional buoys accomplish the task, they are possessed of the inability to sustain the stability required to accomplish such a task reliably. The conventional buoys will heel far over if moored in an ocean current and will radically pitch in reaction to waves. The very close relationship between the motion of the conventional buoy and the motion of the sea subjects the electronic equipment, which is practical enough from the standpoint of size and weight to be carried by the buoy, to stresses and strains which it cannot withstand. Furthermore, when a buoy with a transmitter utilizing a directional antenna is used, the arc of the transmission must be of a large magnitude to compensate for the wide angle encompassing the large number of directions in which the transmission beam is directed due to the movement which the conventional buoy will experience due to the conditions of the sea.

A modern technique is to utilize a moored buoy system at a given coordinate in the sea to measure the environmental conditions of the sea at that point and to transmit, by a transmitter utilizing a directional antenna, these conditions to a twenty-four hour satellite. A twenty-four hour satellite rotates at the same speed that the earth rotates and thereby remains over a fixed coordinate on the earth's surface. Since the satellite is at a fixed point relative to the earth's surface and the buoy system is at a fixed point on the earth's surface, the arc which the radio directional antenna of the buoy transmitter must subtend is solely determined by the amount of movement—heave and pitch—of the buoy as it floats in the sea. By utilizing a buoy which has a minimum heave and pitch motion, a directional antenna which confines its arc of transmission to a narrow beam may be utilized and consequently the size and power requirements of the transmitter can be significantly reduced. Furthermore, by reducing the motion of the buoy system in the sea, the life of each of the electronic components in the environmental sensing equipment and in the transmitter can be greatly increased along with a subsequent increase in the reliability of these components.

It is therefore the general purpose of this invention to provide a minimum motion moored buoy system which embraces all of the advantages of the similarly employed prior art devices and possesses none of the aforedescribed disadvantages. To attain this desired performance, the present invention contemplates a unique and novel arrangement of components and elements so as to provide a minimum motion moored buoy system which has a minimum reaction to a statistically significant portion of the surface conditions of the sea anticipated in the locations chosen for mooring.

Accordingly, it is an object of the present invention to provide a novel combination of components which comprise a minimum motion buoy system having minimal reaction to dynamic sea conditions.

Another object of the present invention is to provide a moored buoy system which is compatible with a transmitter utilizing a directional antenna which is characterized by narrow beam pattern transmission characteristics.

A further object of the present invention is to provide a moored buoy system capable of carrying electronic equipment which cannot withstand violent motions.

Other objects and many of the attendant advantages of this invention will be readily appreciated as the same becomes better understood by reference to the following detailed description when considered in connection with the accompanying drawings wherein.

Figure 1:
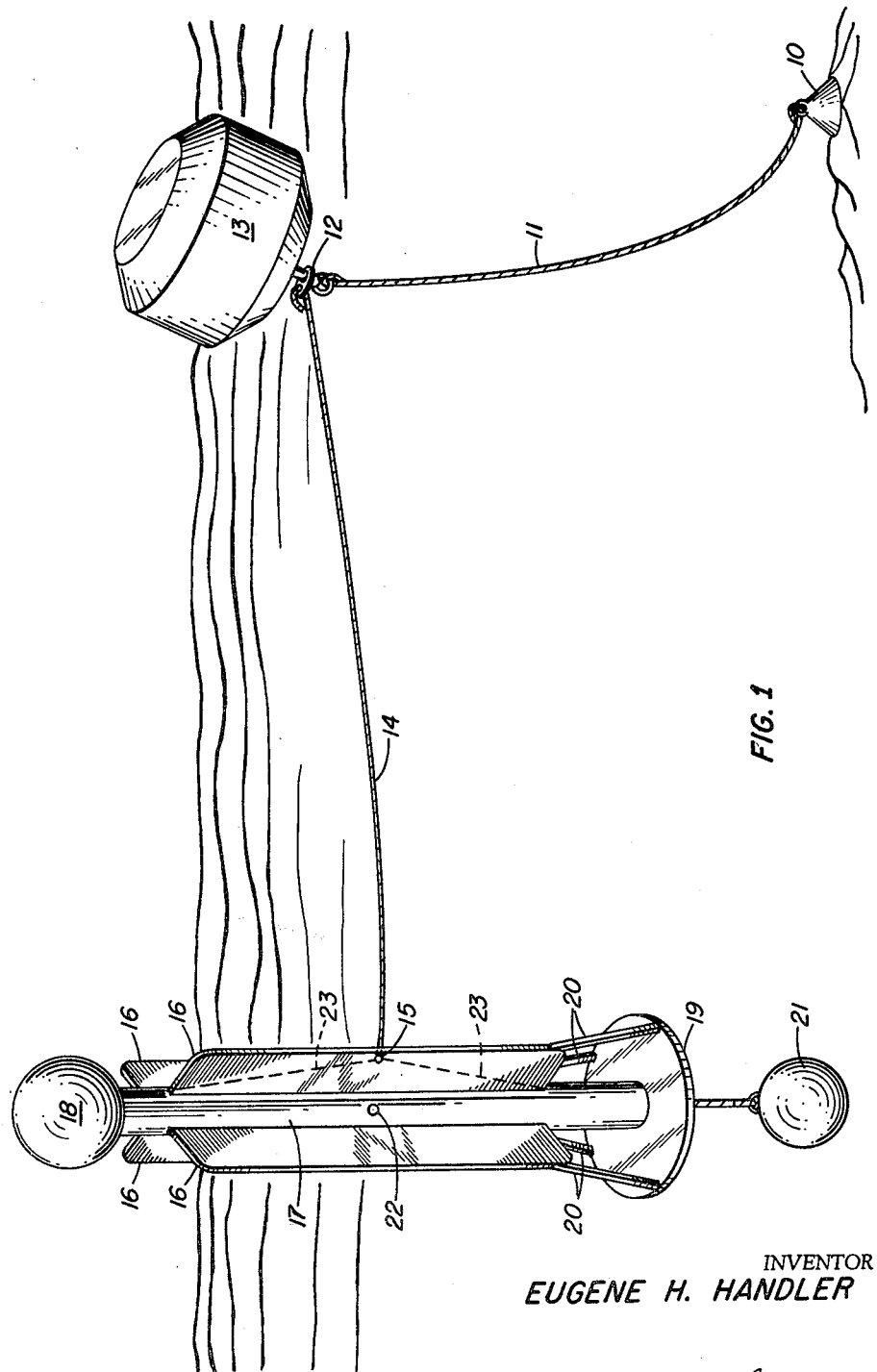
FIG. 1 is an illustrative schematic of the present invention.

Referring now to FIG. 1, an illustrative embodiment of the present invention is disclosed in a manner deemed to best illustrate the operational association of the elements and components comprising the present invention. A buoy or float 13 is moored to the ocean floor by an anchor 10 by virtue of a mooring line 11. The mooring line 11 is connected to the buoy or float 13 through a non-fouling coupling 12. Also connected to the float 13 through the non-fouling coupling 12 is the semi-rigid or rigid link 14. A slender metallic tube could be utilized to interconnect the two buoys. Such a tube would be axially incompressible yet capable of bending along its longitudinal axis and therefore semi-rigid. Alternatively, link 14 could be a hose filled with high pressure air. Such a hose would tend to straighten out and would provide sufficient rigidity to prevent the two buoys from coming in close proximity yet be flexible along its length. By providing a hollow link between float 13 and buoy 18, the mass of link 14 is reduced, rendering it more nearly buoyant and providing a conduit for wiring should it be necessary to house auxiliary equipment in float 13.

These two alternatives are described only by way of example, it being understood that any means for providing a link of similar rigidity would be acceptable. In the optimum condition, the line 14 constrains the movement of the buoy 17 in that the distance of travel of the buoy 17 from the float 13 in an outward direction is limited thereby and the rigidity of link 14 tends to prevent the buoy 17 from moving toward the float 13.

The buoy 17 is formed of an elongated cylindrical body which has mounted thereon vertical or longitudinal fins 16. Mounted at the bottom of the buoy body 17 is a circular disc or plate 19 which is further supported by the interconnections 20 between the fins 16 and the periphery of the plate 19. The link 14 is connected to the buoy 17 at the outward extremity 15 of one of the fins 16. Supported atop the buoy 17 is a capsule 18 which houses electronic gear and more specifically houses a transmitter. More particularly, due to the propensities of this minimum motion buoy system, the capsule 18 is able to house a transmitter utilizing a radio directional antenna which transmits a narrow beam, i.e., a small arc of transmission, hence its highly directional characteristics. Suspended below the buoy 17 is a second capsule 21 which houses electronic gear to sense the environmental conditions at various levels in the sea or in the water body in which the buoy is floating. The illustration in FIG. 1 discloses only one sensing capsule 21; however, numerous such capsules may be suspended from the buoy 17 to measure conditions of the water at different levels.

The point 22 illustrates the center of buoyancy of the buoy system. The connection point 15 on the longitudinal fin 16, at which point the link 14 is connected, is at the same vertical height as the center of buoyancy 22. Furthermore, the buoy 17 is fabricated so that the center of gravity is as near as possible to the center of buoyancy without being vertically above it so that a minimum interaction of moments about the two centers is attained. In a force diagram of the instant invention, one force vector passes through the center of gravity, a second force vector passes through the center of buoyancy, and a third force vector passes through the point at which the link 14 is attached to the buoy. The farther the center of gravity is displaced from the center of buoyancy the greater the possibility for interaction of moments since the resultant vector indicating the force of gravity passes verticallly downward through the center of gravity and the resultant vector indicating the force of buoyancy passes vertically upward through the center of buoyancy. The closer the center of gravity is to the center of buoyancy the less the magnitude of the moment and when the two centers actually coincide the resultant force of gravity directly opposes the resultant force of buoyancy resulting in no moment. Further, in the ideal situation, the vector representing the force applied to the buoy by the link 14 passes through the coinciding centers of gravity and buoyancy thereby preventing the force acting upon the buoy by the link 14 from coacting with either the gravity force or buoyancy force to cause a moment on the buoy.

The nearer the resultant forces of gravity, buoyancy and pull by the restraining cable 14 are to passing through a common point, the more the buoy is controlled solely by its outside configuration of fins and discs and by righting moment provided by the suspended capsule 21, which provides a novel buoy suitable for particular functions. That is to say, when the buoy is under minimal reaction to the forces of gravity, buoyancy and the link, it is controlled by the hydrodynamic control surfaces such as the disc and fins. In the event that the vertical axis of the buoy is displaced from the vertical by sea forces, the suspended mass of the capsule 21 will provide a righting moment.

The sought after result which is attained by the present invention is that the natural periods of oscillation in pitch and in heave are substantially increased; that is to say, the buoy 17 will not pitch and heave with the same frequency as the frequency by which waves pass the buoy. All of the elements of this invention contribute to provide a remarkably stable buoy.

In the operation of the apparatus, the float 13 is utilized so that the link 14 which restrains the horizontal movement of the buoy 17 subjects the buoy 17 only to a horizontal force. The horizontal force, as transmitted to the buoy 17 by the link 14, is transmitted to the buoy at the connection point 15 on the fin 16 so as to reduce the capacity of the buoy 17 to react to any moments about a horizontal axis. This is exemplified by a buoy restrained in movement by the link 14 being connected directly to the buoy body. In that configuration, any force which might be applied to the buoy by a wave would tend to create a moment about the point on the buoy body at which link 14 is attached; however, by attaching the link 14 at connection point 15 there is established a yoke through which the horizontal force of the link 14 is transmitted to the buoy. This yoke is formed by the fin 16 and is illustrated by the dotted line 23. To accomplish the same result without connecting the link 14 to a fin 16, a line, as shown by the dotted line 23, is attached to the buoy at the extremities of the fin thereby to form a triangle with an apex at point 15. This yoke thus establishes a connection through which the horizontal forces transmitted by the link 14 are applied to the buoy 17 and consequently impedes any moment tending to rotate the buoy about the horizontal axis.

The longitudinal fins 16 impede rotational and horizontal movement of the buoy 17. The plate or disc 19 impedes vertical movement of the buoy 17.

In an attempt to provide a stable mooring system, the prior art devices have utilized a buoy which has a low center of gravity. This arrangement, however, is not entirely satisfactory since in adverse sea conditions the link which restrains the buoy transmits a force to the buoy which creates a moment about the low center of gravity so that the buoy becomes disposed in the water at an angle with the vertical. The possibility of this high moment condition arising is minimized by disposing the center of gravity along the vertical axis of the buoy so that it is as vertically near the center of buoyancy of the buoy as possible and by further connecting the restraining link 14 to a connection point 15 which is as vertically near the center of buoyancy as possible.

Any moment about the vertical axis of a buoy without fins is critical and causes the buoy to rotate about the vertical axis, thus, wrapping the restraining link 14 around the buoy body. If the restraining link is wrapped around the moored body and a wave passes, the buoy is forceably caused to rotate in the opposite direction in a rather drastic manner to unwind the restraining link. This condition is eliminated by utilizing longitudinal dampening fins 16 to impede any rotational or horizontal movement of the buoy.

The relationship, as set forth above, of the center of gravity and the connection point at which the restraining link is connected to the buoy tends to reduce the effect of any moments that might be applied to the buoy 17 by surface conditions of the sea. The vertical fins 16 prohibit horizontal movement and restrain any pitching moments of the buoy 17. The horizontal plate or disc 19 impedes any vertical movement of the buoy 17. This system has provided a very stable mooring system and in fact has reduced the oscillations fifty to seventy percent over that of other buoys utilized in the prior art.

Figure 2:
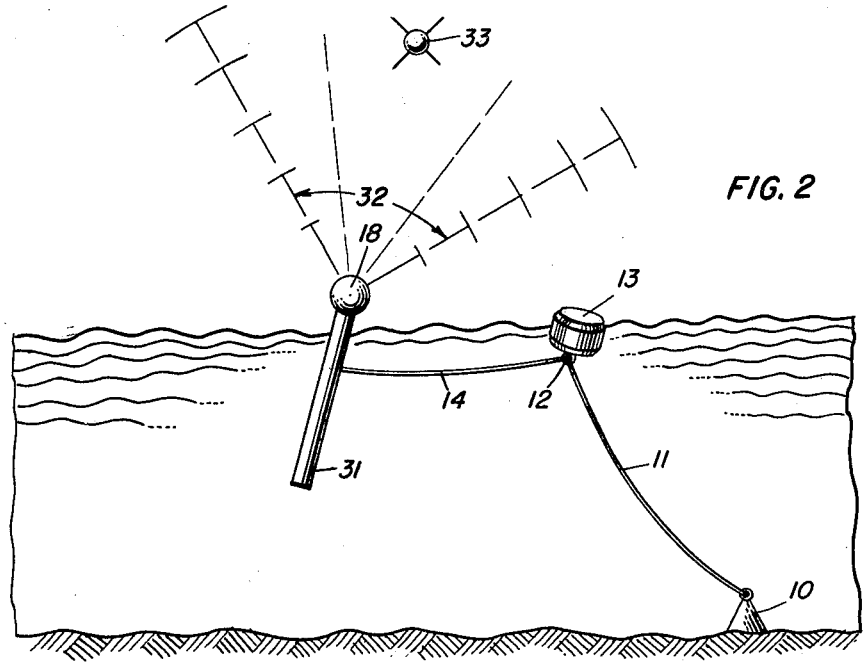
FIG. 2 is an illustration of a conventional buoy utilizing a wide beam transmitter.
Figure 3:
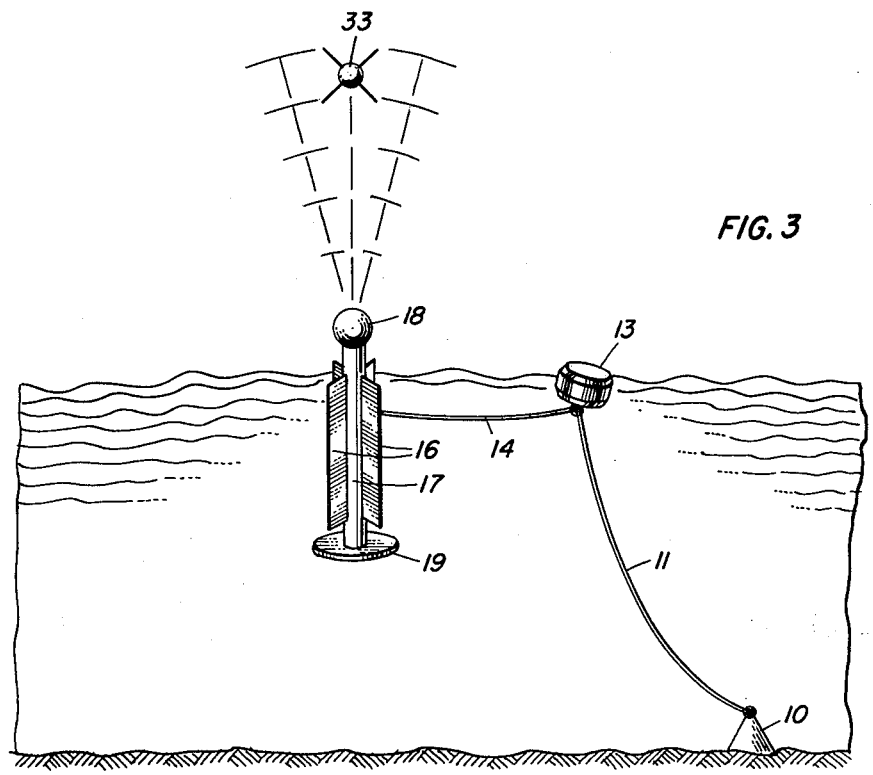
FIG. 3 is an illustration of the present invention utilizing a narrow beam transmitter.

FIGS. 2 and 3 illustrate the advantages which may be attained by the mooring system of the instant invention which is stable during a significant portion of conditions anticipated in the location of the mooring. FIG. 2 discloses a moored buoy 31 which is relatively unstable and sustains large oscillations in pitch. A transmitter utilized in a buoy as disclosed in FIG. 2 must utilize an antenna which has a large arc 32 of transmission to afford accurate transmission at all times to a fixed receiver such as a twenty-four hour satellite 33. The necessity of utilizing such a wide beam radio directional antenna requires a transmitter which has a higher power rating and is generally larger. The instant mooring system, disclosed in FIG. 3, due to the reduced oscillations of the buoy, can utilize a smaller transmitter with smaller power requirements because the radio directional antenna necessary to transmit signals to a stationary receiver, such as a twenty-four hour satellite, may utilize a narrower beam of transmission.

As is apparent from the foregoing description, the present invention provides a minimum motion moored buoy applicable to oceanographic studies and which carries with it electronic gear, of less complexity and therefore more reliability, to accomplish the accurate determination of environmental conditions in the body of water in which the system is deployed.

While the invention has been described in its preferred embodiment, it is to be understood that the terminology used herein is intended to be in the nature of words of description rather than words of limitation.

Obviously many modifications and variations of the present invention are possible in the light of the above teachings. It is therefore to be understood that within the scope of the appended claims the invention may be practiced otherwise than as specifically described.

What is claimed is:

1. The combination of structure for providing a stabilized, floating, directional, transmitter platform comprising:

an elongated cylindrical buoy;

longitudinal fin means attached to said buoy for impeding the motion of said buoy from the vertical position;

a plate means attached to said buoy transverse of the longitudinal axis of said buoy for impeding the vertical motion thereof;

an environmental sensing means suspended from the lower end of said buoy for detecting and providing an output indicative of the conditions of its surroundings;

a transmission means attached atop said buoy and operatively coupled to the output of said sensing means for transmitting data obtained by said sensing means;

a float means;

a rigid linking element connected at one end to said float means and at the other end to one of said fin means at a point substantially horizontal with the center of buoyancy of said buoy;

an anchor and a mooring line connected at one end to said anchor and at the other end to said float;

whereby said buoy will maintain a substantially vertical position so that a minimum arc of the transmitter beam will be required thereby to require a low power transmission means.

2. The combination of structure as set forth in claim 1 wherein;

the center of gravity and the center of buoyancy of said elongated cylindrical buoy are at substantially the same point.

References Cited by the Examiner

UNITED STATES PATENTS

| | | | |
|---|---|---|---|
| 2,856,616 | 10/58 | Dodge | 9—8.3 |
| 2,903,716 | 9/59 | Zasada | 9—8 |
| 3,092,852 | 6/63 | Devereux | 9—63 |
| 3,093,808 | 6/63 | Tatnall et al. | 6—63 |
| 3,103,020 | 9/63 | Bolton | 9—8 X |

FERGUS S. MIDDLETON, *Primary Examiner.*